July 6, 1926.
E. W. DAVIS
LUBRICATING SYSTEM
Filed July 16, 1925
1,591,159
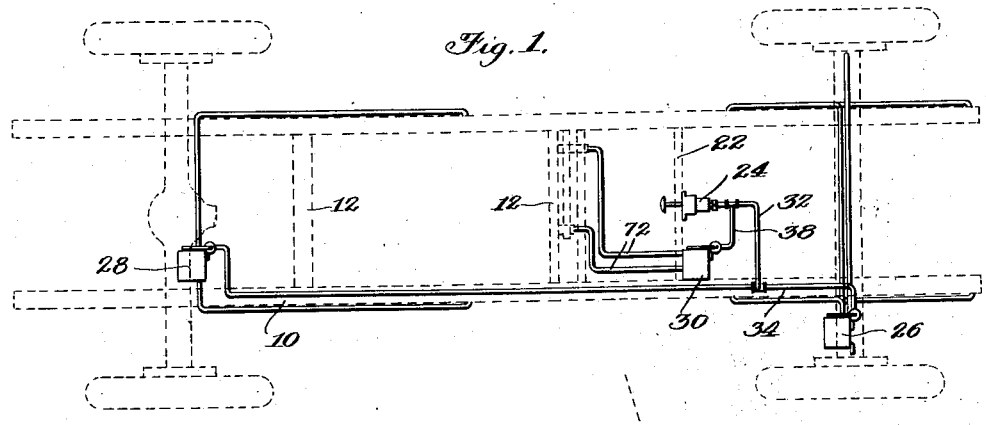
Fig. 1.
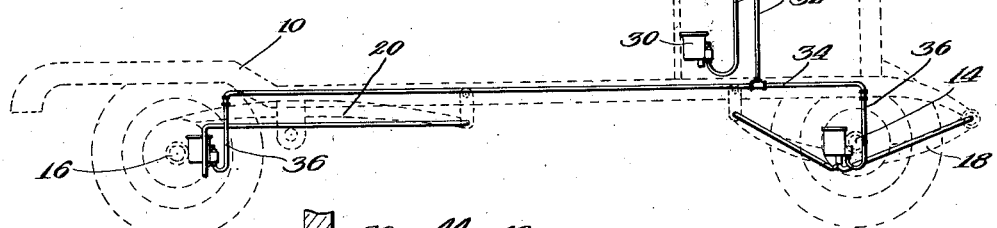
Fig. 2.
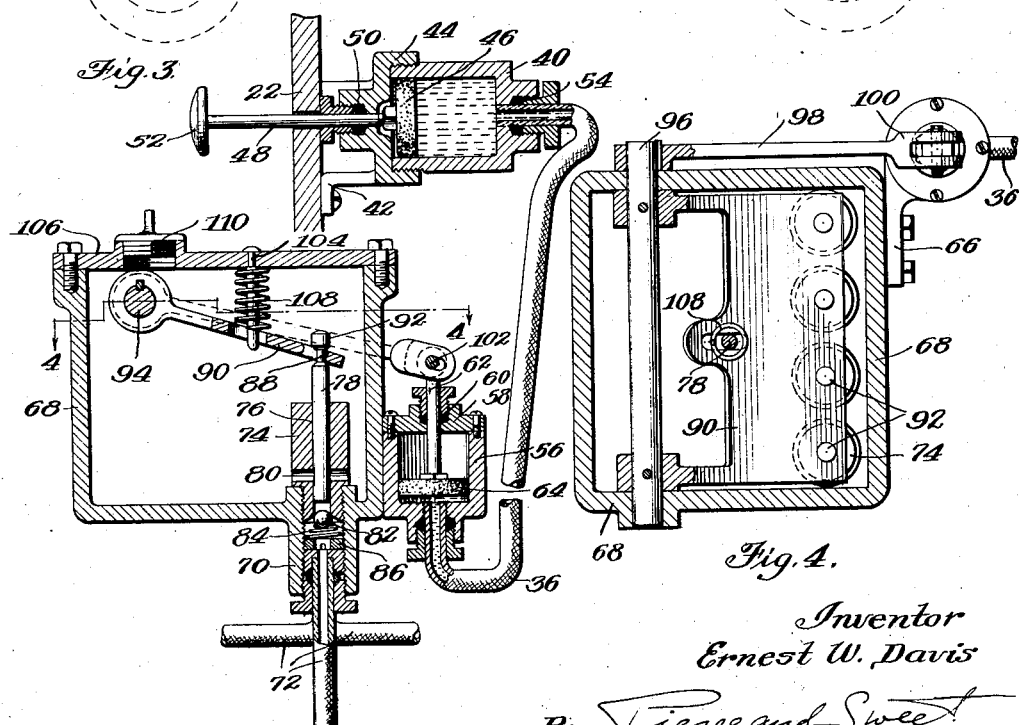
Fig. 3.
Fig. 4.
Inventor
Ernest W. Davis
By Pierce and Sweet
Attys.

Patented July 6, 1926.

1,591,159

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed July 16, 1925. Serial No. 43,988.

My invention relates to improvements in lubricating systems, and more particularly to a novel type of lubricating system for lubricating the chassis bearings of automotive vehicles.

At the present time, several different types of systems are in use, among which is the so-called centralized type. In some systems of this type, a single pump supplies lubricant to all the chassis bearings through individual conduits, with means either in the pump or at the ends of the conduits for determining the amount of lubricant fed to each bearing upon each operation.

In another system of this type, a single conduit passes by a plurality of bearings, and branches lead from the single conduit to each individual bearing. In this case it is imperative to locate the apportioning means adjacent each bearing.

The system employing individual conduits is objectionable on account of the length of the conduits and the difficulty and expense of installing them and keeping them in condition, and the branched conduit system has been found more or less unreliable.

The objects of the present invention are:

First, to eliminate the excessive amount of conduit involved in the individual conduit system, and at the same time avoid the inaccuracies of the branched conduit system. I accomplish this primarily by subdividing the pumping means into several units, each supplying a plurality of bearings in the same portion of the chassis, so that the conduits are much shortened, without making the number of the pumping units excessive.

Second, to provide simple connections for actuating the different pump units independent of any relative displacements between the units and the source of power for actuating them.

Third, to provide connections between the source of power and the pumping units permitting the greatest possible freedom in the location of the units.

Fourth, to employ a localized pump unit substantially complete in itself and requiring no mechanical adjustments in installation to correlate it with the source of power.

Fifth, to provide a pumping unit uninfluenced even by vibrations of great severity, which will also maintain a perfect seal when not in use.

Further objects and advantages of my invention will become apparent as the description proceeds.

In the accompanying drawings:

Figure 1 is a plan view of a system according to the invention, indicating its application to a motor vehicle chassis shown in dotted lines.

Figure 2 is a side elevation of the parts shown in Figure 1.

Figure 3 is a structural sectional view through the source of power and the pumping unit.

Figure 4 is a section on line 4—4 of Figure 3.

The embodiment of the invention selected for illustration has been illustrated as applied to an ordinary motor vehicle comprising a frame built up of side members 10 with several cross braces 12, and front and rear axles 14 and 16 below the frame and supporting the same by means of front springs 18 and rear springs 20 respectively. The dash board is indicated at 22 as a convenient point for mounting the manually actuated power source 24. A plurality of pumping units are provided, in this instance three, a front axle unit 26, a rear axle unit 28 and a frame and body unit 30 attached respectively to the front and rear axles and to the frame in any suitable or preferred manner.

To transmit energy from the power source 24 to each of the units, I employ a hydraulic transmission operating through a preferably rigid conduit 32, a longitudinal conduit 34 and flexible, depending conduits 36 to reach the axle units. Connection with unit 30 presents no difficulty and a simple branch connection 38 has been illustrated for this purpose.

Referring now to Figure 3, the source of power illustrated comprises a cylinder 40 mounted on the dash 22 by means of lugs 42 projecting from the cylinder head 44. The piston 46 is actuated by the piston rod 48 passing through a suitable packing 50 and terminating in a push button or head 52. The discharge conduit is connected at the other end of the cylinder and sealed by suitable packing 54. To actuate the pumping unit I provide a similar cylinder 56 receiving conduit 36 at its lower end, and having a head 58 and packing 60 for the piston rod 62 actuated by the piston 64. Where a single source of power is to actuate a plurality of units, it will be obvious that the combined volume of all the cylinders 56 should not be greater than the volume cylinder 40. The cylinder 56 carries a lug 66 for bolting it to the casing 68 of the pumping unit proper which it is to operate. The casing 68 is provided with a plurality of tubular bosses 70 in its bottom, threaded internally to receive suitable packing for the individual discharge conduits 72, each leading to one or more of the individual bearings to be lubricated. Each boss receives a cylinder body 74 at its upper end, provided with a vertical bore 76 receiving plunger 78, and a transverse bore 80 providing lateral inlet ports to the cylinder. Between the cylinder and the packing for the discharge conduit the boss houses the discharge check valve 82 held in place by a spring 84 bearing on the threaded collar 86.

Each plunger is reduced as at 88 to pass through an aperture in a rocker plate 90, and carries an enlarged head 92 above the plate to enable the plate to move the plunger in both directions. The aperture receiving the parts 88 must obviously fit with a little looseness to allow for the angular movement of the plate. The plate is keyed to a shaft 94 journaled in the walls of the casing 68 and projecting beyond the said shaft at 96 to receive a keyed arm 98 terminating in a bifurcation 100 straddling the upper end of the piston rod 62, and connected thereto by pin 102. Either the piston rod or the bifurcation, preferably the latter, receives the pin in slots to allow for the angular movement of the parts. Suitable spring means are provided for retaining the pumping parts normally in the position shown in Figure 3. I have illustrated a guide pin 104 fastened to the cover 106 and guiding the spring 108 bearing on the upper surface of the plate. The cover 106 is provided with a suitable filling aperture and plug 110.

It will be apparent that the pumping unit illustrated in Figure 3 is complete in itself, and that, by reason of the use of flexible conduits 36, it can be positioned with the utmost freedom in any desired spot and effectively connected with the power source independent of such location. It will also be apparent that even under the particularly severe vibration to which such a unit might be subjected in case the vehicle were driven at speed over rough pavements with the tires flat, no oil would escape to discharge conduit 72 except upon actuation of the device in the normal way. This is because, during any upward acceleration of the parts, plunger 78 could not fail to be in the position shown in Figure 3, and a tendency to lift the check valve 82 from its seat would not permit any oil to escape, and during acceleration in the opposite direction plunger 78 is held down not only by gravity and spring 108 added to the dash pot action of cylinder 56, but by the suction above check valve 82. Under such circumstances it will never be lifted far enough to clear ports 80 by anything less than the normal pressure actuation of the piston 64.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. The combination with an automotive vehicle chassis comprising an axle, and a frame supported on said axle and movable relatively thereto, of means for lubricating bearings on said axle comprising a supply tank and pump mounted on said axle, conduits extending from said pump to said bearings, and means for actuating said pump comprising a conduit extending from a point on said frame to said pump, a portion of said conduit being flexible to accommodate the relative movements of said axle and frame, said conduit being filled with a substantially incompressible fluid, means on said frame for moving the fluid in said conduit, means actuated by said moving fluid for actuating said pump in one direction, and a spring for actuating said pump in another direction.

2. The combination with an automotive vehicle chassis comprising an axle, and a frame supported on said axle and movable relatively thereto, of means for lubricating bearings on said axle comprising a supply tank and pump mounted on said axle, conduits extending from said pump to said bearing, and means for actuating said pump comprising a conduit extending from a point on said frame to said pump, said conduit being filled with a fluid, means on said frame for moving the fluid in said conduit, means actuated by said moving fluid for actuating said pump in one direction, and a spring for actuating said pump in another direction.

3. The combination with an automotive vehicle chassis comprising an axle and a frame supported by said axle, of means for lubricating a bearing on said axle comprising a pump supported by said axle, a conduit leading from said pump to said bearing, a cylinder on said frame, a cylinder on said axle, pistons in said cylinders and means for transmitting motion from one of said pistons to the other comprising a column of fluid and a conduit confining the same, said conduit having a flexible portion.

4. The combination with an automotive vehicle chassis comprising front and rear axles and a frame supported on and movable with respect to said axles, of lubricating means including a pump on each axle, a pump on said frame, a supply tank for each pump, an actuating device on said frame, a hydraulic connection between said device and the pump on said frame, and flexible hydraulic connections operating independently of relative movement between said axles and said frame for connecting each of the pumps on said axles with said device.

5. The combination with an automotive vehicle chassis comprising front and rear axles and a frame supported on and movable with respect to said axles, of lubricating means including a pump on each axle, a pump on said frame, a supply tank for each pump, a hydraulic transmission for actuating the pump on said frame, a flexible hydraulic transmission for actuating each of the pumps on said axles, and a common actuating device for all said transmissions.

6. The combination with an automotive vehicle chassis comprising front and rear axles and a frame supported on and movable with respect to said axles, of lubricating means including a pump on each axle, a pump on said frame, a supply tank for each pump, a hydraulic transmission for actuating the pump on said frame, and a flexible hydraulic transmission for actuating each of the pumps on said axles.

In witness whereof, I hereunto subscribe my name this 11th day of July, 1925.

ERNEST W. DAVIS.